United States Patent [19]

Thomas et al.

[11] 3,749,916

[45] July 31, 1973

[54] PROGRAM SELECTION DEVICE, FOR USE IN PROGRAMING AUTOMATIC SCINTILLATION SPECTROMETRY

[75] Inventors: Edward W. Thomas, Morris Plains; Edward Rapkin, Short Hills, both of N.J.

[73] Assignee: Intertechnique S.A., Plaiser, France

[22] Filed: Nov. 22, 1968

[21] Appl. No.: 778,057

[30] Foreign Application Priority Data

Nov. 24, 1967 France .............................. 67129686

[52] U.S. Cl... 250/106 SC, 250/71.5 R, 250/219 D, 340/172.5

[51] Int. Cl. ............................. G01t 1/20, G01t 7/08

[58] Field of Search ..................... 250/71.5, 106 SC, 250/219 ID; 340/347 NO X, 172.5 X

[56] References Cited

UNITED STATES PATENTS 3,604,935 9/1971 Nather .......................... 250/106 SC 3,246,156 4/1966 Frank et al. .................. 250/71.5 X 3,394,262 7/1968 Kintigh ......................... 250/219 ID

OTHER PUBLICATIONS

Findlay; D. J., "Electronic Controls for Machine Tools;" Electronics; Feb. 1965 pp. 122–129

*Primary Examiner*—Archie R. Borchelt
*Attorney*—Lane, Aitken, Dunner & Ziems

[57] ABSTRACT

A measuring and data reduction program to be carried out on a group of samples located in successive links of a conveyor is determined by locating a program selection plug in a link in front of the group. The plug carries a coded address which is serially read as the plug is moved past the working station, decoded and used to call out one of a plurality of programs stored in an auxiliary memory for transfer into the main memory of an on-line computer integrated in the spectrometer unit.

13 Claims, 6 Drawing Figures

INVENTORS
EDWARD W. THOMAS &
EDWARD RAPKIN

BY Lane, Aitken, Dunner & Ziems
ATTORNEYS

INVENTOR
EDWARD W. THOMAS &
EDWARD RAPKIN

BY Lane, Aitken, Dunner & Ziems
ATTORNEYS

INVENTOR
EDWARD W. THOMAS &
EDWARD RAPKIN

BY Lane, Aitken, Dunner & Ziems
ATTORNEYS

INVENTORS
EDWARD W. THOMAS &
EDWARD RAPKIN

BY Lane, Aitken, Dunner & Ziems
ATTORNEYS

INVENTORS
EDWARD W. THOMAS &
EDWARD RAPKIN

BY Lane, Aitken, Dunner & Ziems
ATTORNEYS

PROGRAM SELECTION DEVICE, FOR USE IN PROGRAMING AUTOMATIC SCINTILLATION SPECTROMETRY

BACKGROUND OF THE INVENTION

The present invention relates to selection of one among a plurality of predetermined measure and data reduction programs to be carried out on at least one sample located in a link of a conveyor. This program may include a plurality of successive or simultaneous measurements, a processing of the results, control of a recorder, etc.

An important but in no way exclusive application of the invention resides in the selection of one among a plurality of predetermined programs relating to operation of of a liquid scintillation spectrometer. Liquid scintillation spectrometers have now developed up to a point where they are an essential tool in the biologic and bio-medical fields and in related fields. Such liquid scintillation spectrometers generally comprise a conveyor or the like having links for receiving samples and adapted to carry and stop them in seriatim order to a counting station, a sample changer which transfers that sample which is located at the counting station into a counting chamber, and a detection, measuring and data reduction unit adapted to count the scintillations occurring in the sample and to derive from their rate and energy the activity and nature of the radio-isotopes in the sample. When a sample has been counted, it is moved back to the working station by the changer and movement of the conveyor is resumed for bringing the next sample to the working station.

A sample liquid scintillation spectrometer is more often than not used by several experimenters to whom are allocated groups of successive links of the conveyor, the groups being separated by one or several empty links or by appropriate markers. The samples belonging to different groups have frequently different activities or even include different radio-isotopes so that each group should be processed with a different adjustment of the pulse-height analyzers or of the discriminators of the detection, amplification, discrimination and counting unit. In addition, the samples of different groups frequently exhibit amounts of quenching which are quite different and this factor too should be taken into account if a correct and accurate measurement is to be made on each and every type of samples.

Attempts have been made in the past to provide automatic adjustment of certain parameters of the counting unit just prior to arrival of a group of similar samples to the working station. In a liquid scintillation spectrometer a marker may be located in a conveyor link before each sample group. The marker has a plurality of pluggable openings each associated with a light source-photocell pair and each pair commands a predetermined adjustment of the window of a pulse-height analyzer or the like which is stored in a memory for the operation to be repeated on successive samples.

Such a solution makes it possible to use a single pulse-height analyzer or discriminator on the condition that several successive measurements be made on the same sample, with energy windows which are different. This approach is not satisfactory for several reasons. Since all light source-photocell pairs are read in parallel, they provide a relatively low quantity of information so that the number of controls, sequences of operation or adjustments which may be made is severely limited, the adjustments should be pre-selected by the operator, for instance using manually controlled dials. If several counting operations with different settings of the discriminators or analyzers are made, the time duration necessary for dealing with a single sample is considerably increased.

SUMMARY OF THE INVENTION

It is an object of the invention to provide a process and apparatus for automatically selecting one of a plurality of measuring and data reduction programs to be carried out on samples located in links of a conveyor.

It is a more particular object of the invention to provide a method and apparatus adapted to automatically select any one of a plurality of programmed instructions for use in a liquid scintillation spectrometer.

Other objects and advantages of the invention will appear from the following description of an embodiment of the invention, given as an example only. The description refers to the accompanying drawings.

BRIEF DESCRIPTION OF THE PREFERRED EMBODIMENTS

Figure 1:
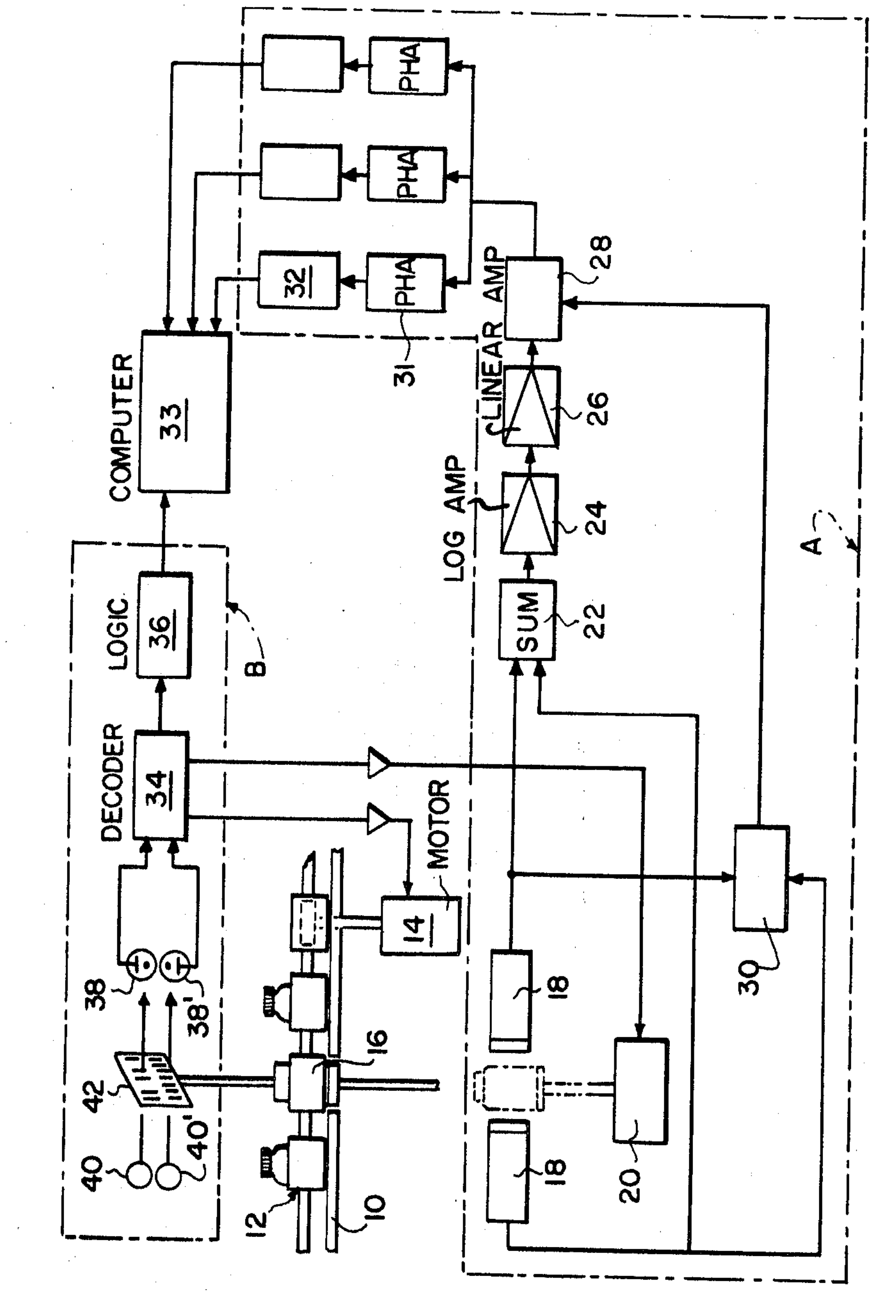
FIG. 1 is a diagrammatic partial representation of a liquid scintillation device embodying the invention, showing in simplified form a block diagram of the circuitry and part of the conveyor.

Referring first to FIG. 1, there is shown the main components of a liquid scintillation spectrometer adapted to measuring beta decay events in a sample where they are converted to light pulses. Since the liquid scintillation technique has now developed up to a point where its general principles are well known to all those skilled in the art, no indication will be given as to the lines along which such spectrometers operate.

The spectrometer of FIG. 1 conventionally includes a stationary table 10 having a smooth horizontal upper surface on which a conveyor 12 actuated by a motor 14 moves samples located in links of the conveyor. During their movement, the links successively move to a working station, where the sample in the link lies on a platform 16 which, when in its upper position (in full lines in FIG. 1) is level with the table and closes a passage therethrough. In its lower position (in dash lines in FIG. 1), the platform 16 maintains the sample between two photomultiplier tubes 18. The conveyor 12 and sample changer 20 may for instance be of the type disclosed in French Pat. No. 1,524,258 in the name of Intertechnique, S.A. and in U.S. Pat. application Ser. No.

716,213 assigned to the assignee of the present invention, respectively.

The photomultiplier tubes 18 constitute the detecting units of a counting system A, included in the frame in dash-dot lines on FIG. 1. This counting assembly comprises an amplification system having a circuit 22 in which the pulses from both photomultipliers are summed, a logarithmic amplifier 24, a linear amplifier 26 and a linear gate 28 controlled by a coincidence circuit 30 which opens the gate when signals are simultaneously provided by the two photomultiplier tubes 18. The amplification circuit feeds several branches, each corresponding to one of the channels of a multichannel analyzer or to a separate pulse height analyzer 31, whose energy window is adjustable and can be set in accordance with applied digital signals. The output of each channel or selector is connected to a scaler 32, the content of which may be transferred to a computer 33 which is described below. Except for the provision of an on-line computer, the structure which has been described up to now is relatively conventional and a complete description thereof may be found in the literature. A teletype may be used as an input-output device for entering data into the computer and typing out the results, in which case the punched tape and associated tape reader of the teletype may be used as the auxiliary memory of the system which is described below in more detail.

In addition to the counting assembly A, the device according to the invention includes a program selection and call-out assembly B, as indicated by the frame in dash-dot line on FIG. 1. The program selection assembly may be considered as comprising an address reading device, a decoder 34 and a logical unit 36 associated to a computer 33 and its peripheral equipment. These components will be described successively in that order.

Figure 2:
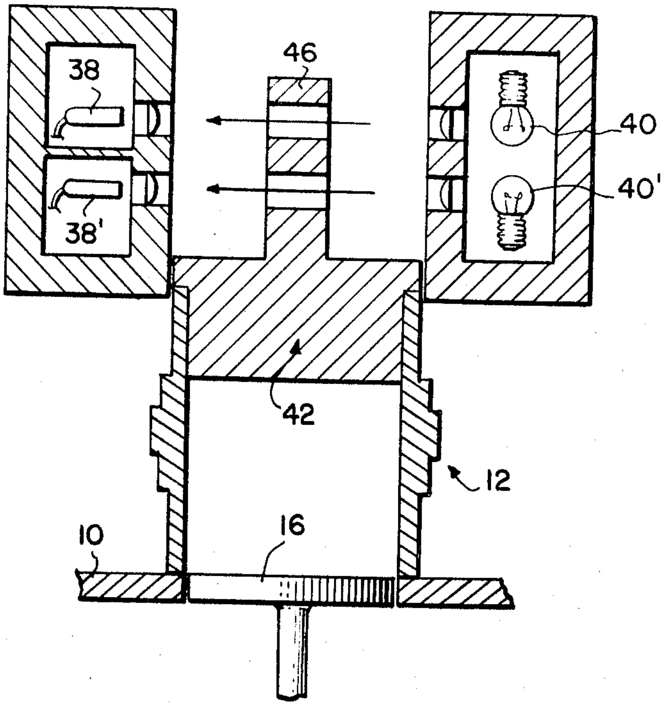
FIG. 2 is a schematic view in elevation and axial section showing a control plug located in a link and associated light source-photocell pairs.
Figure 3:
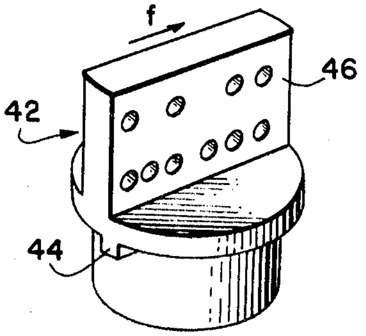
FIG. 3 is an isometric view of the control plug of FIG. 2.

The address reading device illustrated in FIGS. 1, 2 and 3 includes a pair of photocells 38 and 38' each located in front of a light source 40 or 40'. The bulbs constituting the light sources 40 and 40' are located in a first casing confronting a second casing locating the photocells.

A program selection plug 42 (which will be referred to in the following as a "program plug" for simplicity) may be inserted in place of a sample vial in a link of conveyor 12. The plug illustrated in FIGS. 2 and 3 consists of a lower cylindrical portion adapted to be received in the link and provided with a lug 44 which maintains the plug in a proper angular position and an upper portion 46 formed with two horizontal rows of holes at such a level that they cross the optical paths between the light sources and photocells upon displacement of the conveyor. As the upper portion 46 crosses the optical path between the light sources and the photocells, the upper row of holes in the portion 46 pass serially through the optical path between the light source 40 and the photocell 38, and the lower row of holes pass serially through the optical path between the light source 40' and the photocell 38'. As each hole passes through one of the optical paths, a pulse of light falls upon the corresponding one of the photocells 38 and 38'. In the embodiment illustrated in FIGS. 2 and 3, the lower row consists of timing or synchronization holes preferably located at equal intervals. The upper row of holes provide an information word in binary code, the two different values possible for each bit corresponding to the presence or absence of a hole in the upper row adjacent each of the holes in the lower row.

While FIG. 3 illustrates a plug which has a predetermined hole pattern and thereby carries a predetermined number which cannot be changed, it is obvious that standard plugs formed with as many information holes as timing holes may be used, coding being made by closing of the holes with appropriate closure elements. In the embodiment illustrated, each location with a code hole corresponds to the binary digit 1 and each location confronting a timing hole and which is not light-transmissive corresponds to the digit 0, the reverse being of course possible.

As appears in FIGS. 2 and 3, upon continued movement of the conveyor each of the plugs located in links of the conveyor will successively move to and past the working station. Upon such movement, the timing and coding holes of each plug will successively cross the corresponding optical path, thereby providing for easy serial reading.

The plug 42 of FIG. 3 provides six binary digits which are serially read upon movement of the conveyor in the direction indicated by the arrow *f*. In FIG. 3, the number carried in binary code by the program plug is 110101.

The arrangement described above makes it possible to avail of the conveyor travel for serially reading an information word having any number of bits, using two photocell-light source pairs only.

The output signals delivered by the photocells in the form of electrical pulses are fed to a decoder. A simplified block diagram of a decoder suitable for such use is given in FIG. 4, and it being understood that other types may be used.

The timing signals from photocell 38' are first shaped by differentiating them and clamping the negative portion in a conventional circuit (not shown); the shaped signals are then fed to the decoder as unipolar pulses. The code signals from photocell 38 is similarly processed.

After they have been shaped, the signals from the photocells fulfill several purposes: first, the decoded binary word read out from the plug calls out one of a plurality of programs which were previously entered and stored in an auxiliary memory 80 associated with the computer 33 (FIG. 5); second, it causes the selected program to be transferred to the main memory 82 of the computer 33; third, the signal indirectly controls mechanical operations such as stop and re-start of the motor 14 of the conveyor. These functions will be successively described in more detail.

Figure 4:
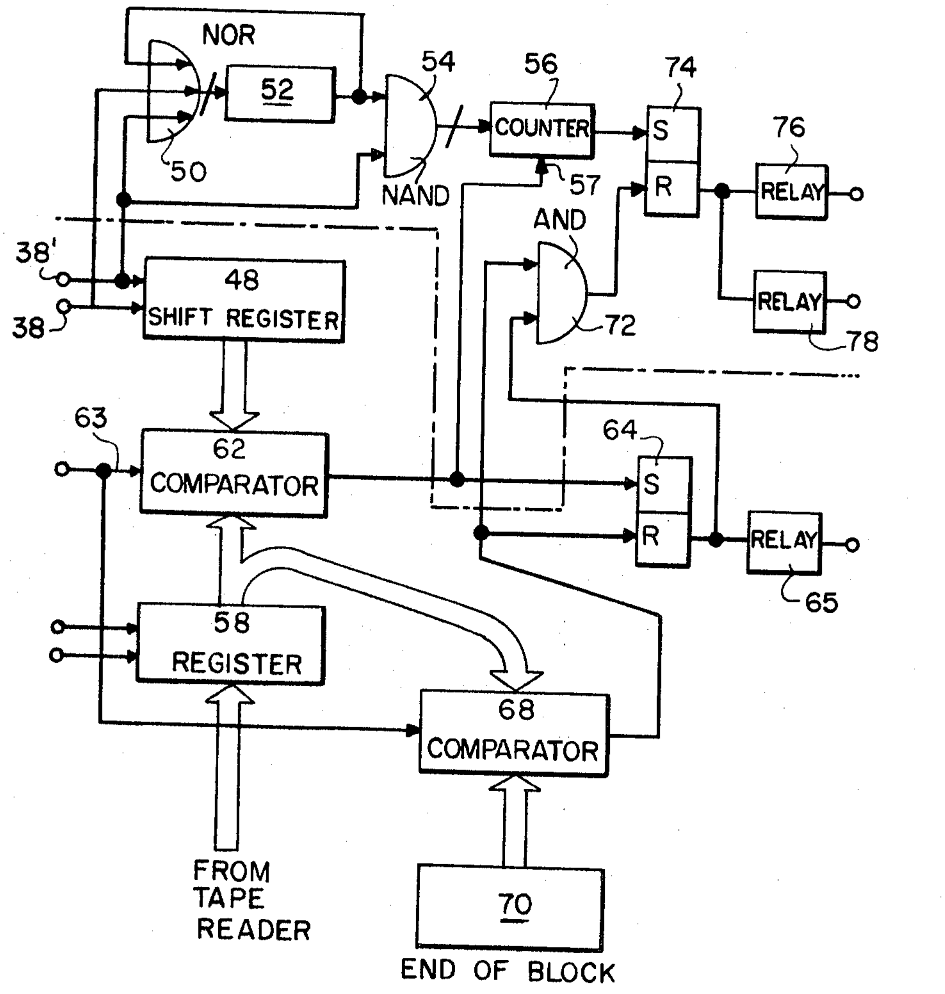
FIG. 4 is a schematic logical block diagram of the decoder portion of the device of FIG. 1.

The signals from the photocells 38 and 38' are respectively applied to the set input and to the "shift" input of a shift register 48 (FIG. 4). As is well known, a shift register is a digital device in which each binary storage cell takes the state of the previous binary storage cell when a shift command appears at the shift input and the first storage cell takes a state which is determined by a "set" signal which must be in the proper state when the shift signal is applied. In FIGS. 1 and 4, the "set" signal applied to the data input is provided by the photocell 38 and the shift signal is provided by the timing photocell 38'. In order to delay the shift signal until the set signal is in the proper state, the assembly of the photocell 38' and the light source 40' is slightly offset with respect to the assembly of the photocell 38 and the light source 40 in the direction of movement of the conveyor 12. This construction provides a time delay t much smaller than the time interval T between successive timing pulses produced by the photocell 38′ as shown in the timing diagram of FIG. 6. The shift register 48 has a number of binary storage cells equal to the number of binary digits of the code signal six bits in FIG. 3). The use of timing holes represents a significant improvement upon the use of an external clock because it makes precise regulation of the conveyor speed unnecessary and the time delay t between the code signal pulses and the timing signal pulses is easily obtained. In addition the movement of the conveyor, which would in any case be necessary in order to successively bring the samples to their counting position, is used for serially reading the signal provided in binary form.

The photocell-light source assemblies may be used for purposes other than described above during the time periods where no program plug is in front of them. For instance, they could be used for detecting arrival of a sample located in a conveyor link to the working station, misplaced samples, etc.

As the holes travel past the photocell-light source assemblies, the shift register decodes the signals received from the photocell 38. Any binary number may be present in the register in initial condition, for instance 111000. This number may have been read out from a previous program plug. As the program plug 42 arrives in front of photocell 40 and moves past it, the register condition will change as follows: each time a binary digit of the code signal is fed into the register and entered responsive to a shift signal, it is written as the least significant digit in the register, while the digit which was previously present is shifted to the next storage cell. Each bit is moved the same way and overflow of the most significant bit occurs. The changes in the register content with time are summarized in the following diagram:

| Time | Register **48** | | Binary Code Signal from **38** |
|---|---|---|---|
| $t_1$ (initial state) | 111 | 000 | |
| | | | 1 |
| $t_1 + \delta t$ | 110 | 001 | |
| $t_1 + T + \delta t$ | 100 | 011 | 1 |
| $t_1 + 2T + \delta t$ | 000 | 110 | 0 |
| $t_1 + 3T + \delta t$ | 001 | 101 | 1 |
| $t_1 + 4T + \delta t$ | 011 | 010 | 0 |
| $t_1 + 5T + \delta t$ | 110 | 101 | 1 |

The last state of the register 48 corresponds to the six - digit word carried by plug 42.

As pointed out above, the computer 33 has associated therewith an "auxiliary memory" 80 and includes a "main memory" 82. These memories are shown in block form in FIG. 5. The auxiliary memory may be a permanent store of any conventional type and is preferably of a type which is low cost and may carry a considerable amount of information, with an access time which may be rather long. In the following, it will be considered that the auxiliary memory is of the type using a movable storage medium, such as a magnetic tape or punched tape and will be referred to as a circulation memory. As indicated above, it may preferably be in the form of a punched tape with an associated tape reader 84, which is part of the standard equipment of a teletype. Several sets of pre-programmed and addressed instructions may be entered all in one tape by the teletype. Each address consists of a six - digit word which can be carried by one of the program plugs 42.

The main memory 82 is of the random access type. As an example, a ferrite core memory of 1,024 words is satisfactory in most cases.

As shown in FIG. 4, a register 58 receives the successive addresses in parallel form from the reader 84 as the addresses are read out from the punched tape circulating before the tape reader. As a result, the address of each particular stored program appears and is stored in the register 58 as the punched tape circulates before the tape reader 84.

The registers 48 and 58 are each connected by a number $n$ of electric lines ($n$ being the number of binary digits of the code, i.e., six in the present embodiment) to a digital comparator 62 which compares the contents of the two registers when it receives a signal on its input 63. Such a signal is delivered by the tape reader 84 immediately upon entry of each new word into the register 58 from the tape reader 84. When the comparator 62 finds both contents are identical, it delivers an output signal to the "set" input of a flipflop 64, the output of which energizes a relay 65. Responsive to actuation of the relay 65, the program block stored in the auxiliary memory 80 and corresponding to the address found identical to the word carried by the program plug (FIG. 5) is read by the reader 84 and fed into the main memory 82 of the on-line computer. As indicated earlier this main memory is of the random access type and the program block stored in the main memory 82 will be available to the computer until changed.

The punched tape is organized so that the blocks of program instructions are stored on the punched tape in the same tracks as the addresses by means of which the program blocks are found by the comparator 62. Each program block is stored on the punched tape after address identifying such program block. Because of this organization, the instructions of each program block are fed to the register 58 as well as the addresses. For this reason, the addresses of the program block are selected so that an instruction in a program block with an identical code never occurs.

The register 58 is also connected via $n$ electric lines to a second comparator 68 adapted to compare the content of the register 58 and an end word written at the end of each program block in the auxiliary memory. Signals representing this end word are applied to the comparator 68 by a circuit 70. When this block end word appears in the register 58, the comparator 68 delivers a signal which resets the flipflop 64 and stops the transfer of information from the auxiliary circulating memory 80 to the main memory 82 of the computer.

Figure 5:
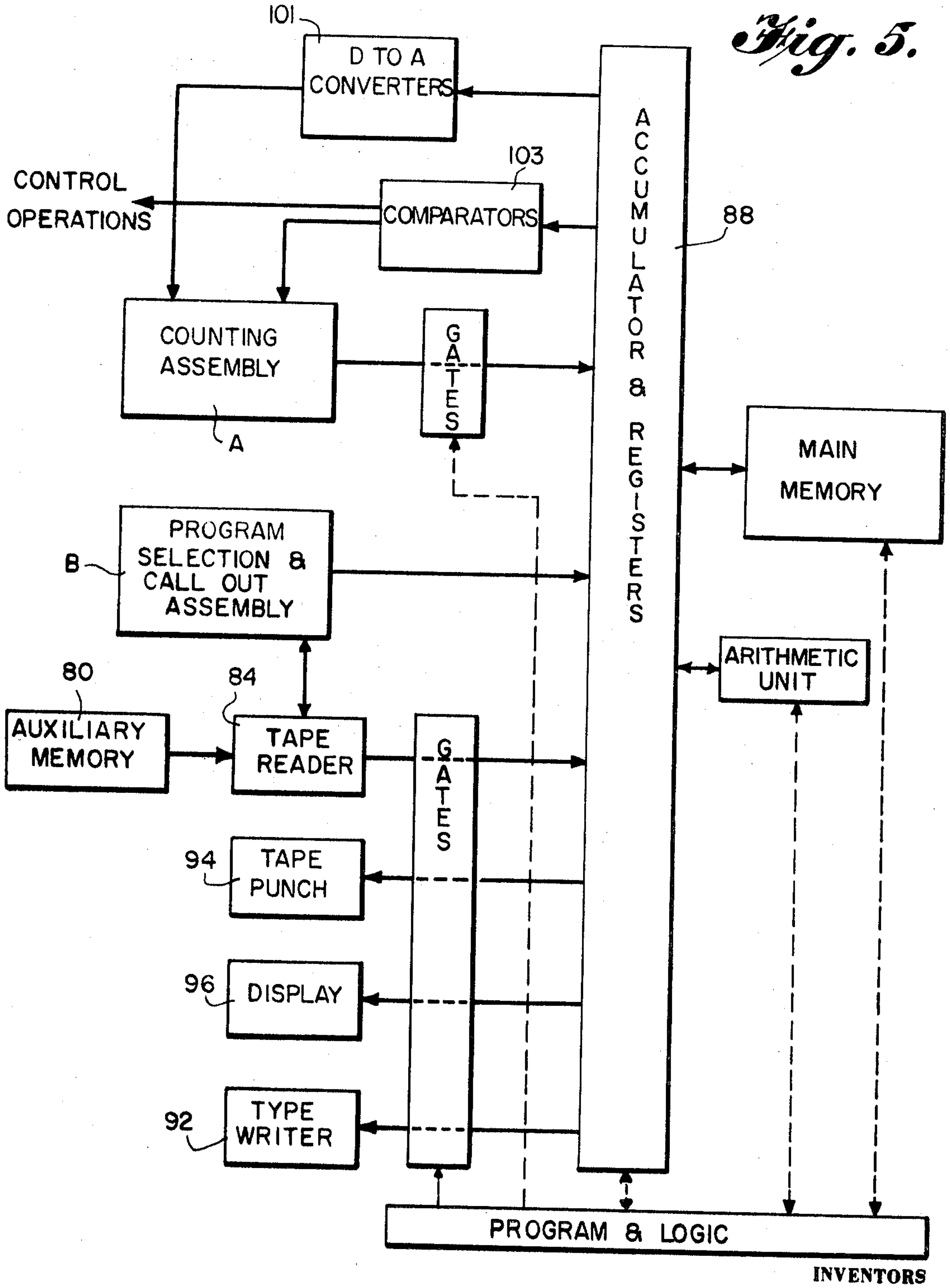
FIG. 5 is a schematic and simplified logical block diagram illustrating the control links between the central unit and the peripheral units of the on-line computer associated with the device of FIG. 1.

Entry of a block of instructions from the tape reader into the memory 82 is via the accumulator 88 of the computer under the control of the program and logic in a conventional manner as shown in FIG. 5. For example, the computer 33 could be in a repeating program, referred to as a subroutine, to display the contents of a register or particular storage location in the memory 82. This particular subroutine is referred to as the standby subroutine. Some of the instructions of the standby subroutine would be to periodically check whether the relay 65 is energized indicating that the tape reader is about to start reading the program block selected by the address in a program plug. In response to detecting this fact the computer program is jumped to another subroutine which controls the entry of the block of instructions into preselected locations in the memory 82. Some of the instructions of this subroutine will check to see if the relay 65 has been deenergized indicating the end word of a program block has been detected by the comparator 68. If the relay 65 has been deenergized, the program will be jumped to the program block just read into the computer from the tape reader and the computer will then carry out this block instruction controlling the operation of the spectrometer. The program block of instructions will include instructions to control the sequence of operations on successive samples brought to the working station, the entry of data from the scalers 32 into the computer and operations by the computer on the data entered into the computer.

The signals from photocells 38 and 38' are also applied on two of the three inputs or a NOR circuit 50 (FIG. 4). The output of the NOR circuit is connected to a monostable multivibrator 52 having an appropriate time constant, higher than the total time required for all holes in a program plug to travel past the photocells. In the preferred embodiment, this time constant is 1.25 sec. The output of the monostable multivibrator 52 is connected to the third input of the NOR circuit 50. The NOR circuit 50 will produce an output signal to trigger the monostable multivibrator whenever it does not receive signals on all three of its inputs. When a program plug first comes into the optical paths between light sources 40 and 40' and the photocells 38 and 38', signals from the photocells 38 and 38' will be cut off. At this time the monostable multivibrator will not be producing an output signal so that NOR circuit 50 will trigger monostable multivibrator 52 in response to a program plug starting into the optical path between the light sources 40 and 40' and the photocells 38 and 38'.

The square wave output signal of the monostable multivibrator 52 is applied to one of the two inputs of a NAND circuit 54. The timing pulses from photocell 38' (which signal has been shaped by differentiating it and clipping the negative portion) are applied to the second input of the NAND circuit 54. Circuit 54 controls a digital counter 56 whose content is increased by unity each time it receives a pulse from the NAND circuit up to $n$ and is reset to zero upon application of a pulse to a reset input 57. The NAND circuit 54 will apply a pulse to the counter 56 each time the pulse waveform applied from the photocell 38 changes in a negative direction while the monostable multivibrator 52 applies its output squarewave to the other input thereof.

Upon receipt of a $n$th pulse after the counter has been reset by the output signal from the first comparator 62, the content of the counter reaches its maximum value. The counter is of a type which then produces an output signal, which is applied to the "set" input of a flipflop 74. As long as it is in "set" condition, the flipflop 74 retains the conveyor stationary through a relay 76 and energizes a relay 78 for operating the reader of the auxiliary circulating memory 80. As explained above, the relay 65 will become operative when the comparator 62 detects an identity between the code in the shift register 88 and the register 58 so that a transfer occurs from the auxiliary (punched tape) memory 80 into the main memory 82.

The flipflop 74 is reset for restarting the conveyor 12 and rendering the reader 84 inoperative by a reset signal provided by an AND circuit 72 connected to its reset input. The two inputs of the AND circuit 72 are respectively connected to the output of the second comparator 68 and to that output of the flipflop 64 which controls the storing of information in the main memory. The AND circuit 72 will pass the output signal produced by the comparator 68, if the flipflop 64 is in its set state. Thus, after the flipflop 64 has been set at the beginning of the program block selected by the code word in the shift register 48, the signal produced by the comparator 68 at the end of the selected program block will pass through the AND circuit 72 and reset the flipflop 74. Thus, the tape reader 84 will be stopped and the conveyor 12 will be restarted. In this manner synchronization is maintained between the storage of the program blocks in the main memory and the operation of the tape reader.

Each block of program instructions which can be read into the memory contains instructions to periodically check to determine if a new program plug has been sensed by the program selection and call out assembly B. This is accomplished by determining whether the relay 78 has been energized. As explained above, the relay 78 becomes energized when the address from a new program plug has been entered into the shift register 48. In response to determining that the relay 78 has been energized, the program will jump into the standby subroutine of displaying the contents of a particular register and periodically checking to determine whether the relay 65 has been energized to indicate that the tape reader 82 is about to start reading the instructions of a new program block to be entered into the main memory 82. As explained above, when such energization of the relay 65 is detected, the computer program jumps to the subroutine to enter the new block of program instructions selected in the main memory 82.

Figure 6:
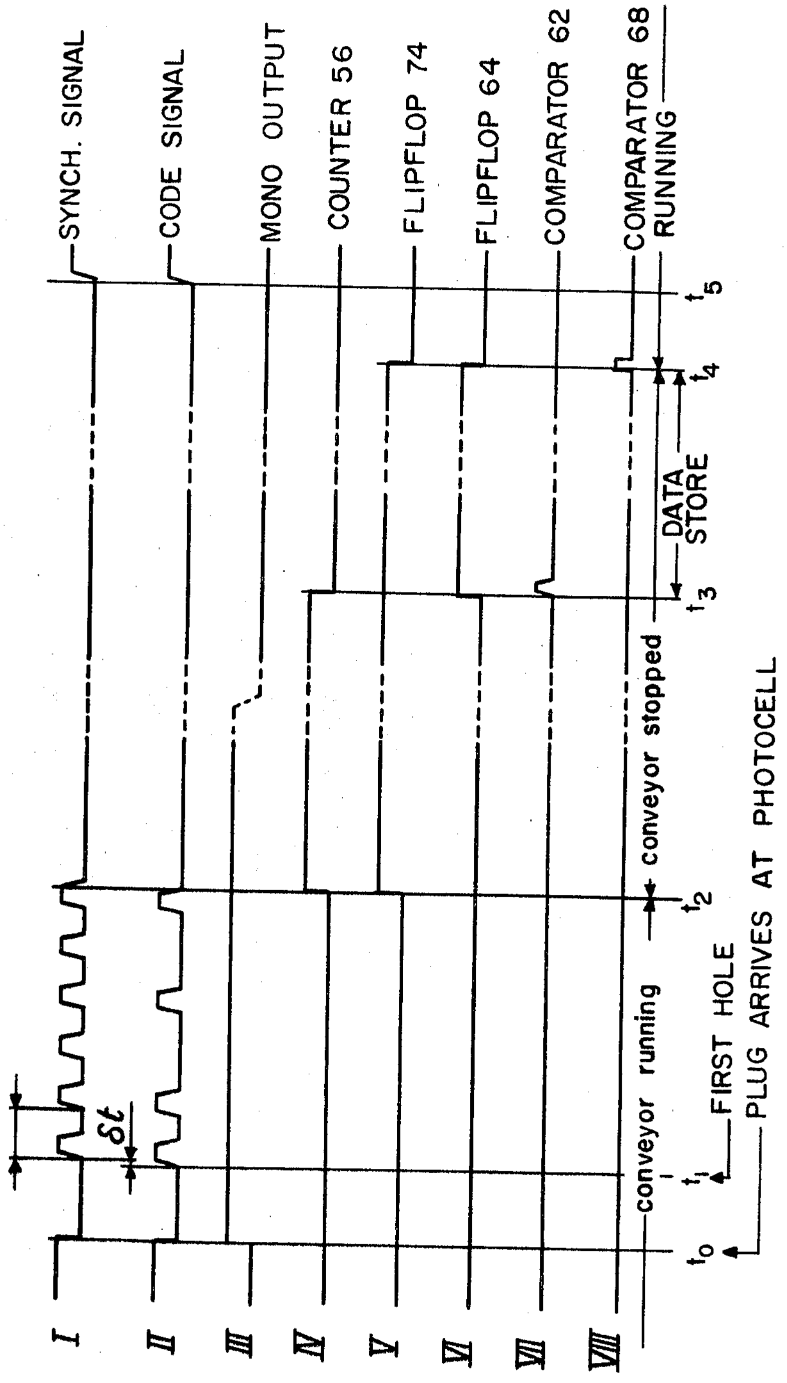
FIG. 6 is a schematic diagram illustrating the time repartition of the signals resulting from movement of the control plug of FIG. 3 in front of and past the photocells.

The operation of the device, the block diagram of which is shown in FIGS. 1 and 4, may be summarized with reference to FIG. 6, in which the successive lines are representative of the electrical signals indicated in the following table.

line I — from photocell 38' (timing or synchronization signal)
line II — from photocell 38 (code signal)
line III — from the monostable multivibrator 52
line IV — from counter 56
line V — from flipflop 74 (controlling operation of conveyor 12)
line VI — from flipflop 64 (controlling storage in the main memory)
line VII — from comparator 62
line VIII — from comparator 68

At time $t_0$ the program plug 42 arrives at the photocells and cuts the optical path between the source and the photocell 38 due to travel of the conveyor carrying the plug. The multivibrator 52 is set to its unstable state and remains in that state for a time duration which is selected so as to be higher than the time interval necessary for all the holes in the program plug to psas in front of the cell as the conveyor continues to move. At time $t_1$, the first hole appears in front of the cell 38. At time $t_2 + \delta t$, the first hole appears in front of photocell 38'. If the plug carried the number 110 101, the signals provided by the photocells 38' and 38 (timing signal and code signal, respectively) will be as indicated on lines I and II in FIG. 6. At time $t_2$, the decoded signal has been transferred into shift register 48 and counter 56 delivers an output signal (line IV) which triggers the flipflop 74, thereby stopping the conveyor and starting the punched tape reader 84 (line V). The auxiliary memory circulates in front of the reader until the address provided by the program plug is located. This condition remains for the variable time necessary for the address to be searched and found, from time $t_2$ to time $t_3$ in FIG. 6. During this interval the successive addresses read on the punched tape sequentially appear in the register 58 and are compared by comparator 62 with the selected address word stored in the shift register 48. When the identity is determined by the comparator at time $t_3$ (line VIII), the comparator 62 delivers a pulse which:

resets counter 56 to zero (line IV)

initiates storage of the program block corresponding to the address from the auxiliary circulating memory 80 into the main random access memory 82 (ferrite cores for instance).

Data is stored in the main memory in the time period from $t_3$ to $t_4$, the conveyor remaining stationary. At time $t_4$, the comparator 68 delivers a signal responsive to termination of the program block (line VII) and starts the conveyor again. At time $t_5$, the program plug moves past photocell 38 and does not intercept light any longer (line II).

From time $t_5$ on, the program stored in the main memory 82 of the computer determines the sequence of the operations on each of the successive samples which are brought to the working station by the conveyor until another program plug crosses the optical paths between the photocells 38 and 38' and the light sources 40 and 40'.

A program block, which has been transferred from the auxiliary memory 80 to the main memory 88, may be used for altering the parameters of the measuring and data reduction system, such as channel limits or channel width, counting time, background subtraction, and low level count rejection. Channel limits can be set by the program by sending digital numbers representing the selected limits to output registers. These numbers would then be applied to digital to analogue converters 101, which would convert the digital signals to analogue signals. The resulting analogue signals would then be applied to the pulse height analyzers 31 to set the channel limits thereof. Alternatively, one of a set of comparators 103 could be set to respond to a particular digital word in an output register to set one or more of the channel limits of the pulse height analyzers 31 at predetermined values. The counting time of the scalers 32 is determined by enabling the scalers and then disabling the scalers after the selected time interval or intervals. By using some of the comparators 103 to enable and disable the scalers 32 in response to particular words in the output registers, the counting times can be set by the computer program. The background subtraction and low level count rejection are carried out internally on the data fed to the computer by the scalers and, accordingly, are readily altered by the computer program. The program blocks which may be transferred from the auxiliary memory to the main memory may contain coefficients of polynomial equations representing quench correction as functions external standard channel ratio or representing constant efficiency curves to be used in computing the rate of occurrence of decay events. The program would then use these equations in operating on the data received from the scalers 32. The stored program block may be used to determine the sequence of the operations carried out on each sample: for instance vertical travel to the counting chamber, first count of the sample with an external standard gamma source inducing scintillation in the sample for determination of the quenching by the external standard or external standard channel ratio method, second count of the sample for the same time after removal of the source for determination of the contribution of the sample, third count of the sample and return of the sample to the conveyor. These control operations are carried out in the desired sequence by means of the comparators 103, which respond to a predetermined code words in one or more output registers in the computer. Different comparators responding to different digital words each cause a different one of the operations to be carried out. Thus, by sending the code words to the output registers in the right sequence, selected sequence of operation will be achieved.

The comparators 103 like the comparator 68 produce an output pulse in response to detecting an identity between the signals applied and a predetermined digital word. These pulses are used to activate appropriate circuitry and apparatus to carry out the selected operations or functions directed by the digital words, which are detected by the comparators in the output registers.

The stored program may be used to control the output devices such as a typewriter 92, the tape punch 94 or an analogue device 96 providing a visual display of the computed results.

It is clearly apparent from the above that the present invention satisfies a need in the liquid scintillation spectrometry for a method and apparatus rendering most operations completely automatic while remaining quite flexible. The system of the invention is significantly superior to the writing of the program in coded form on a control plug. In the latter case, the amount of information which may be provided by the plug is severely limited. The present invention makes it possible to call for any one of a number of complex programs by storing the programs in an auxiliary memory and writing the address of the selected block on the plug. The auxiliary memory may be constituted by low cost punched tape equipment which is available as a peripheral equipment in the form of a teletype such as are commonly used as an input-output device in liquid scintillation units. The main memory may have a relatively low capacity, since one program only is stored in the main memory at a time.

While the program may be entered into the auxiliary memory by the operator using the typing machine, preprogrammed instructions may be entered into the memory as a standard part of the system, thereby sparing the necessity for the operator to become involved in writing programs. Since the program plug of the invention may be located in any link preceding those in which the samples are placed, it can be used in association with a construction disclosed and claimed in U.S. Application Ser. No. 734,426 assigned to the assignee of this invention. The two systems can operate without interference.

While a particular embodiment of the invention has been illustrated and described in full detail, various modifications can obviously be made without departing from the scope and spirit of the invention, as defined by the appended claims.

We claim:

1. An apparatus for automatically carrying out a program of operations on a group of samples comprising a conveyor to move said samples in sequence to a working station, an auxiliary memory containing a plurality of programs of operations to be carried out on said samples, each being stored at a different address in said auxiliary memory, a main memory having a capacity sufficient to store one of said programs, automatic means for automatically carrying out that program which is stored in the main memory on each sample carried by said conveyor upon such sample being moved to said working station by said conveyor, a plurality of program selection plugs each carrying a coded word representing one of the addresses of said programs and adapted to be received in said conveyor, reading means for reading the word from each of said plugs in sequene as said samples are moved past the working station by said conveyor, and transfer means for transferring into said main memory the program corresponding to the address represented by each coded word upon such coded word being read out by said reading means.

2. An apparatus as recited in claim 1 wherein the coded word on each of said plugs is defined as a row of marks extending parallel to the direction of travel of said conveyor, and wherein said reading means comprises sensing means positioned to sense said marks as said plugs are moved past said sensing means by said conveyor.

3. An apparatus as recited in claim 2 wherein each of said plugs contains a second row of synchronization marks extending parallel to said first mentioned row of marks and wherein said reading means further comprises second sensing means positioned to sense said second row of marks as said plugs are moved past said second sensing means by said conveyor and accumulating means controlled by synchronization signals produced by said second sensing means in response to the marks in the second row on each of said plugs to accumulate coded word signals produced by said first mentioned sensing means in response to the marks in the first mentioned row on each of said plugs.

4. An apparatus according to claim 2 wherein said sensing means comprises light source means confronting a photocell and separated therefrom by the path of said plug, wherein said marks are in the form of transparent and opague portions.

5. An apparatus according to claim 3 wherein said accumulating means comprises a first shift register having a data input and shift input, means for applying said coded word signals to said data input, and means for applying said synchronization signals to said shift input.

6. An apparatus according to claim 5 wherein said first mentioned sensing means and said second sensing means are offset in the direction of travel of the conveyor to delay said synchronization signals relative to said coded word signals.

7. An apparatus as recited in claim 1 wherein said reading means includes a first register to store each of the coded words as such coded word is read out from a plug by said reading means and wherein said transfer means includes a second register, a storing means for storing in sequence in said second register coded words representing the addresses of the programs stored in said auxiliary memory, and comparator means responsive to an identity between the coded words stored in said first and second registers to transfer from the auxiliary memory the program at the address represented by the coded word in said second register to said main memory.

8. An apparatus as recited in claim 7 wherein said transfer means includes a reading device for reading said programs stored in said auxiliary memory in sequence and wherein said storing means stores the coded word representing the address of each of said programs in said second register immediately prior to the reading of such program by said reading device, and wherein said comparator means transfers to said main memory the next program read out by said reading device after detecting an identity between the coded words in said first and second registers.

9. An apparatus as recited in claim 1 wherein said samples are radioactive and wherein said programs direct operations by said automatic means on said samples to perform measurements of the radioactivity of said samples.

10. An apparatus for automatically carrying out a program of operations on a group of samples comprising a conveyer adapted to move said samples in sequence to a working station, a program selection plug carried by said conveyer and carrying a coded word defined as a row of marks on said plug parallel to the direction of travel of said conveyer identifying a single corresponding program among a plurality of separately stored programs, sensing means positioned to sense said marks in sequence on said plug and produce signals representing said marks as said plug is moved past said sensing means by said conveyer, means for separately storing a plurality of programs, means responsive to the signals produced by said sensing means for automatically selecting said corresponding program in said storing means, and means responsive to the signals produced by said sensing means for automatically carrying out said corresponding program of operations on each sample in said conveyer in succession as said sample is moved to said working station by said conveyer.

11. An apparatus for automatically carrying out a program of operations on a group of samples comprising a conveyor adapted to move said samples in sequence to a working station, an auxiliary memory containing a plurality of programs of operations to be carried out on said samples,each program being stored at an address in said auxiliary memory, a main memory having a capacity to store one of said programs, automatic means for automatically carrying out that program which is stored in the main memory on each sample in said conveyor upon such sample being moved to said working station by said conveyor, a program selection plug carried by said conveyor and carrying a coded word representing one of the addresses of said programs in said auxiliary memory, reading means for reading the coded word from said plug as said conveyor moves said samples to said working station, and transfer means for transferring into said main memory the program corresponding to the address represented by the coded word read out from said program selection plug by said reading means.

12. A process for carrying out operations on a series of samples comprising moving said samples in sequence to a working station, storing a plurality of programs of operations to be carried out on said samples in an auxiliary memory each program being stored at a different address in said memory, coding a plurality of said addresses on program plugs in the form of coded words, moving said program plugs along with said samples as said samples are moved to said working station, reading the coded words out from said plugs in sequence as said plugs are moved past a reading station, transferring the program from said auxiliary memory at the address represented by each of said coded words to a main memory upon such coded word being read out from a program plug, and carrying out the operations directed by the program in said main memory on each of said samples upon such sample being moved to said working station.

13. A process as recited in claim 12 wherein said samples are radioactive samples and said programs direct operations of said samples to perform measurements of the radioactivity of said samples.

* * * * *